(12) United States Patent
Lim et al.

(10) Patent No.: US 8,446,682 B2
(45) Date of Patent: May 21, 2013

(54) TWO-AXIS STAGE AND CAMERA MODULE HAVING THE SAME

(75) Inventors: Soo-Cheol Lim, Suwon-si (KR);
Jung-Seok Lee, Suwon-si (KR);
Byung-Woo Kang, Seoul (KR);
Jae-Hyuk Park, Yongin-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 194 days.

(21) Appl. No.: 12/853,044

(22) Filed: Aug. 9, 2010

(65) Prior Publication Data
US 2011/0194199 A1 Aug. 11, 2011

(30) Foreign Application Priority Data
Feb. 8, 2010 (KR) .................. 10-2010-0011597

(51) Int. Cl.
*G02B 7/02* (2006.01)
(52) U.S. Cl.
USPC .......................................... 359/824; 359/814

(58) Field of Classification Search
USPC .................................. 359/822, 824, 813, 814
See application file for complete search history.

(56) References Cited

U.S. PATENT DOCUMENTS
2009/0040633 A1* 2/2009 Chikami ....................... 359/824

\* cited by examiner

*Primary Examiner* — Alicia M Harrington
(74) *Attorney, Agent, or Firm* — McDermott Will & Emery LLP (57) ABSTRACT

A camera module in accordance with an embodiment of the present invention includes a housing, a first shaft, which is disposed in a first axis direction and coupled to the housing in such a way that the other end part can be tilted against one end part, a moving guide, which is mounted on the first shaft in such a way that the moving guide can slide in the first axis direction, a second shaft, which is disposed in a second axis direction and supported by the housing in such a way that the second shaft can be tilted against the housing, a lens module, which is mounted on the second shaft in such a way that the lens module can slide in the second axis direction, and a driver, which moves the lens module in the first axis direction and the second axis direction.

18 Claims, 10 Drawing Sheets

TWO-AXIS STAGE AND CAMERA MODULE HAVING THE SAME

CROSS-REFERENCE TO RELATED APPLICATIONS

This application claims the benefit of Korean Patent Application No. 10-2010-0011597, filed with the Korean Intellectual Property Office on Feb. 8, 2010, the disclosure of which is incorporated herein by reference in its entirety.

BACKGROUND

1. Technical Field

The present invention is related to a two-axis stage and a camera module having the two-axis stage.

2. Description of the Related Art

Today's mobile terminals, such as mobile phones, PDAs and mobile PCs, not only transmit short-text messages or voice data but also take a photograph and transmit video data. In response to this trend, a camera module is typically installed in today's mobile terminals in order to enable photographing, video data transmission and video chatting.

In step with the trends toward higher-performance camera modules, camera modules are increasingly required to have not only an auto-focusing function to automatically adjust the lens focus but also an optical image stabilizing function to compensate camera-shake caused by unstable hands.

In a camera module equipped with an optical image stabilizer (OIS), however, since the lens and the image sensor often make complex relative movements, there may be degradation of the camera module due to misalignment of the optical axis. Particularly, it is quite difficult to make a perfect alignment of the optical axis and the image sensor during the assembly of the camera module.

SUMMARY

The present invention provides a two-axis stage and a camera module having the two-axis stage that can be used in an optical image stabilizer so as to make a perfect alignment of the optical axis and the image sensor during an initial assembly.

An aspect of the present invention provides a two-axis stage. The two-axis stage in accordance with an embodiment of the present invention can include a base, a first shaft, which is disposed in a first axis direction and coupled to the base such that the other end part can be tilted against one end part, a moving guide, which is mounted on the first shaft such that the moving guide can slide in the first axis direction, a second shaft, which is disposed in a second axis direction and supported by the base such that the second shaft can be tilted against the base, and a movable body, which is mounted on the second shaft such that the movable body can slide in the second axis direction. Here, the second shaft can include a coupling part and a supported end part. The coupling part is coupled to the moving guide, and the supported end part is supported by the base such that the supported end part slides in the first axis direction.

The base can include a base support, which is coupled to the one end part of the first shaft, a first adjustable support, which is coupled in such a way that the other end part of the first shaft is height adjustable, and a second adjustable support, which supports the supported end part of the second shaft in such a way that the supported end part can slide and is height adjustable.

The first adjustable support can include a slope or steps. The slope declines toward the base support, and the steps descends toward the base support.

The second adjustable support can include a slope or steps. The slope declines toward the coupling part and extended in the first axis direction, and the steps descends toward the coupling part and extended in the first axis direction.

The first shaft and the second shaft can be perpendicular to each other.

The moving guide can include an L-shaped guide. The L-shaped guide can include a first arm, which is extended in the first axis direction such that the first arm slides over the first shaft, and a second arm, which is extended in the second axis direction such that the second arm is coupled to the second shaft.

Another aspect of the present invention provides a camera module. The camera module in accordance with an embodiment of the present invention can include a housing, a first shaft, which is disposed in a first axis direction and coupled to the housing in such a way that the other end part can be tilted against one end part, a moving guide, which is mounted on the first shaft in such a way that the moving guide can slide in the first axis direction, a second shaft, which is disposed in a second axis direction and supported by the housing in such a way that the second shaft can be tilted against the housing, a lens module, which is mounted on the second shaft in such a way that the lens module can slide in the second axis direction, and a driver, which moves the lens module in the first axis direction and the second axis direction. Here, the second shaft can include a coupling part and a supported end part. The coupling part is coupled to the moving guide, and the supported end part is supported by the housing in such a way that the supported end part slides in the first axis direction.

The housing can include a base support, which is coupled to the one end part of the first shaft, a first adjustable support, which is coupled in such a way that the other end part of the first shaft is height adjustable, and a second adjustable support, which supports the supported end part of the second shaft in such a way that the supported end part can slide and is height adjustable.

The first adjustable support can include a slope or steps. The slope declines toward the base support, and the steps descends toward the base support.

The second adjustable support can include a slope or steps. The slope declines toward the coupling part and extended in the first axis direction, and the steps descends toward the coupling part and extended in the first axis direction.

The first shaft and the second shaft can be perpendicular to each other.

The moving guide can include an L-shaped guide. The L-shaped guide can include a first arm, which is extended in the first axis direction in such a way that the first arm slides over the first shaft, and a second arm, which is extended in the second axis direction in such a way that the second arm is coupled to the second shaft.

The lens module can include a lens barrel, which houses a lens, and a movable housing, which is coupled to the lens barrel and mounted on the second shaft in such a way that the movable housing can slide. Here, the driver can include a magnetic member, which is coupled to the movable housing, and an electromagnet, which is coupled to the housing and generates a magnetic field that interacts with a magnetic field of the magnetic member.

The camera module can further include a Hall sensor, which is coupled to the housing and detects a change in location of the magnetic member by sensing a change in magnetic field of the magnetic member.

The camera module can further include an image sensor, which forms an image with a ray of light incident through the lens.

The camera module can further include a vibration sensor, which detects vibrations of a hand.

The camera module can further include an image stabilizing controller, which controls the electromagnet in correspondence with a signal of the vibration sensor.

Additional aspects and advantages of the present invention will be set forth in part in the description which follows, and in part will be obvious from the description, or may be learned by practice of the invention.

DETAILED DESCRIPTION

The features and advantages of this invention will become apparent through the below drawings and description.

Figure 1:
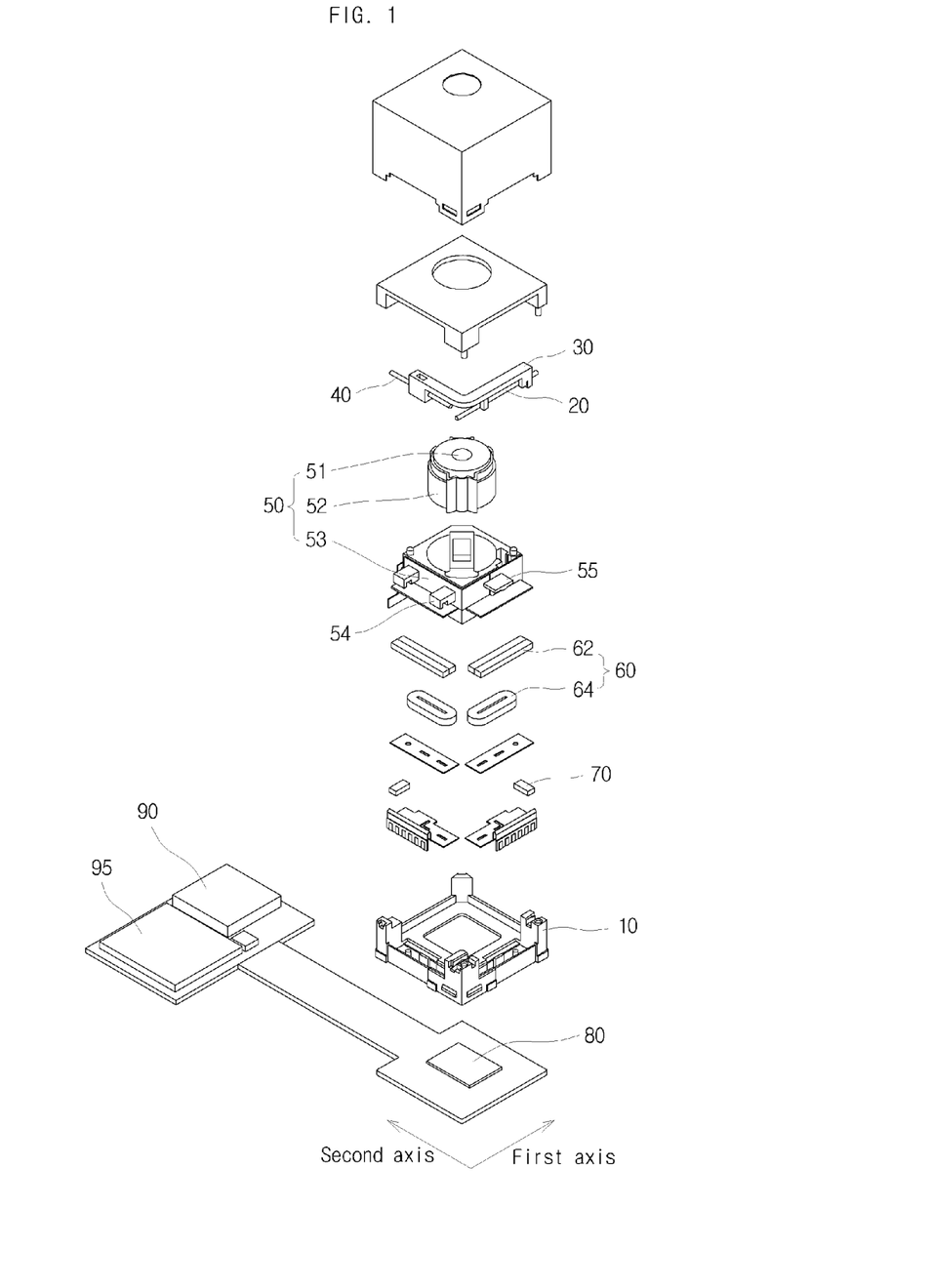
FIG. 1 is an exploded perspective view of a camera module in accordance with an embodiment of the present invention.
Figure 2:
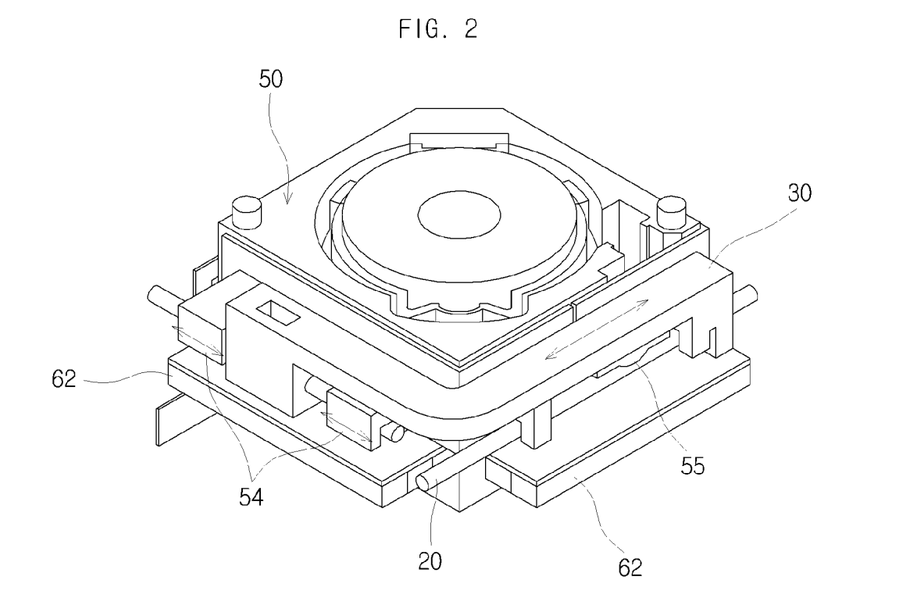
FIGS. 2 and 3 are assembly diagrams illustrating a camera module in accordance with an embodiment of the present invention.
Figure 3:
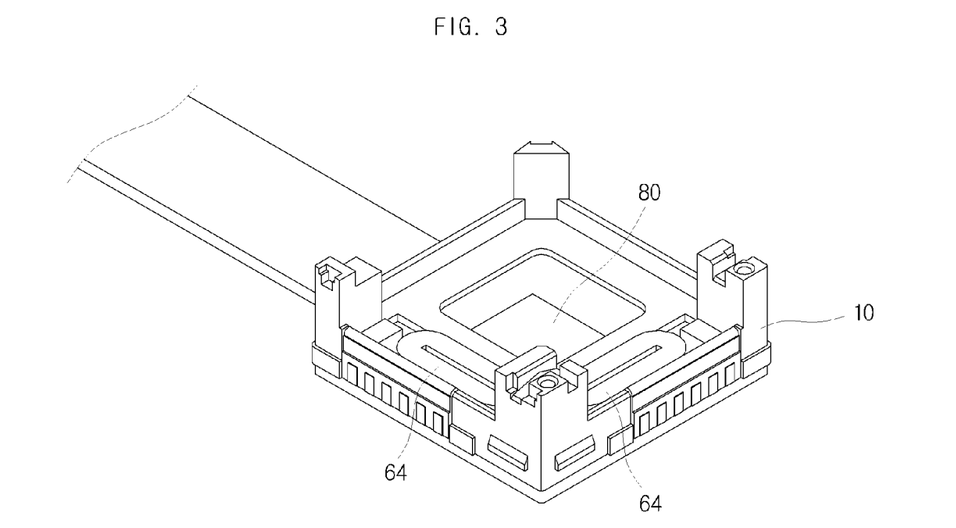

FIG. 1 is an exploded perspective view of a camera module in accordance with an embodiment of the present invention, and FIGS. 2 and 3 are assembly diagrams illustrating a camera module in accordance with an embodiment of the present invention.

The camera module of the present embodiment functions to compensate vibrations of hands by having a two-axis stage that enables tilting control, and includes a housing 10, a first shaft 20, a moving guide 30, a second shaft 40, a lens module 50 and a driver 60.

The housing 10 of the present embodiment is where the components constituting a camera module are housed and supported, and functions as a base for the two-axis stage.

For this, a base support 12 and a first adjustable support 14 are provided to support the first shaft 20, which will be described later. Moreover, a second adjustable support 16 is provided to support the second shaft 40, which will be described later. The base support 12, the first adjustable support 14 and the second adjustable support 16 will be described later in more detail when the first shaft 20 and the second shaft 40 are described.

The first shaft 20, which supports the moving guide 30 such that the moving guide 30 slides in a first axis direction, is coupled to the housing 10 and disposed in the first axis direction. The first shaft 20 of the present embodiment also functions to support the lens module 50, which will be described later, when the lens module 50 slides.

Particularly, the first shaft 20 of the present embodiment can be coupled to the housing 10 such that one end part 24 can be tilted against the other end part 22. Accordingly, the moving guide 30 and a lens barrel 52, which are supported by the first shaft 20, can be tilted together with the first shaft 20.

FIGS. 4 to 7 are diagrams illustrating the moving guide 30 sliding over the first shaft 20 in a camera module in accordance with an embodiment of the present invention.

Figure 4:
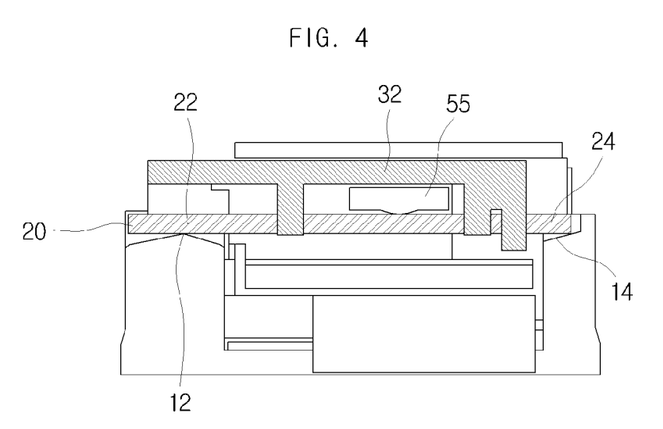
FIGS. 4 to 7 are diagrams illustrating how a camera module operates in accordance with an embodiment of the present invention.
Figure 5:
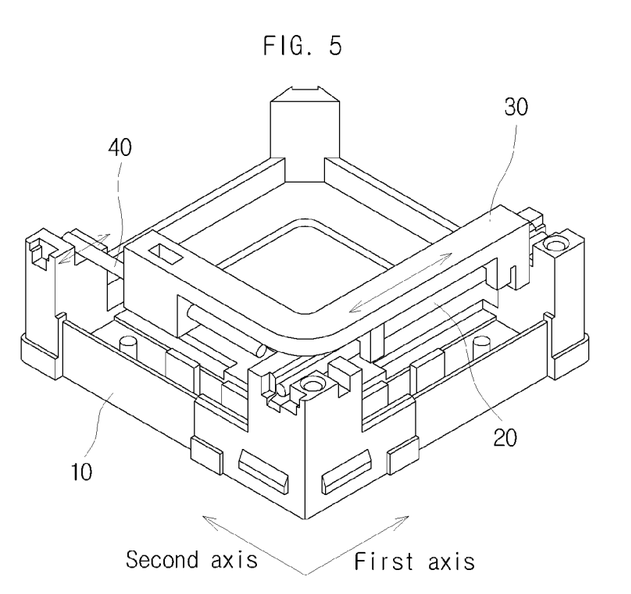

Formed in the housing 10 of the present embodiment are the base support 12, to which the other end part 22 of the first shaft 20 is coupled, and the first adjustable support 14, to which the one end part 24 of the first shaft 20 is coupled for height adjustment, as illustrated in FIGS. 4 and 5. Accordingly, the first shaft 20 is coupled to the housing 10 in such a way that the one end part 24 can be tilted against the other end part 22 for height adjustment. As a result, the first shaft 20 can be tilted against the first axis for height adjustment, i.e., tilting control of the first shaft 20 against the first axis direction is possible.

Figure 8:
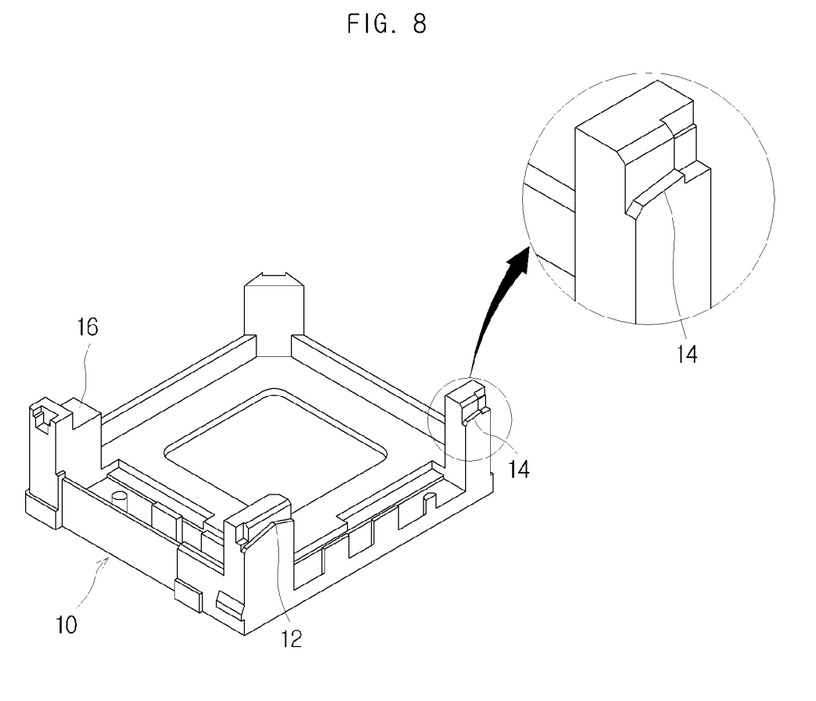
FIGS. 8 to 10 are diagrams illustrating the tilting control of a camera module in accordance with an embodiment of the present invention.
Figure 9:
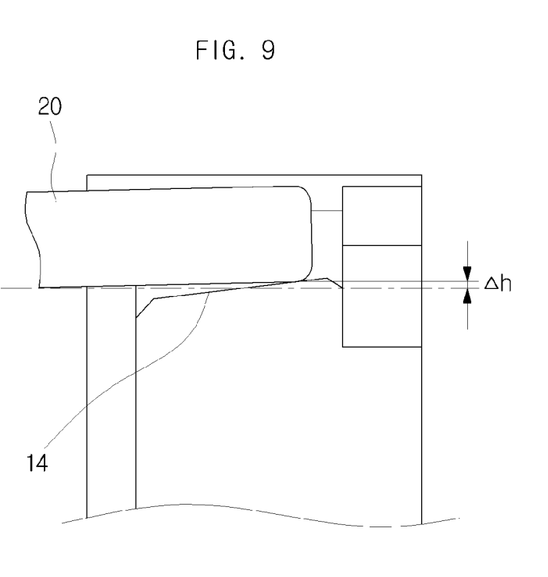

Specifically, in the present embodiment, the first adjustable support 14 is provided with a slope that is sloped downward toward the base support 12 so that the height of the one end part 24 of the first shaft 20 can be readily adjusted, as illustrated in FIG. 8. Accordingly, as illustrated in FIG. 9, a height change Δh of the one end part 24 of the first shaft 20 can be controlled by adjusting where the one end part 24 of the first shaft 20 is supported on the slope of the first adjustable support 14.

Figure 10:
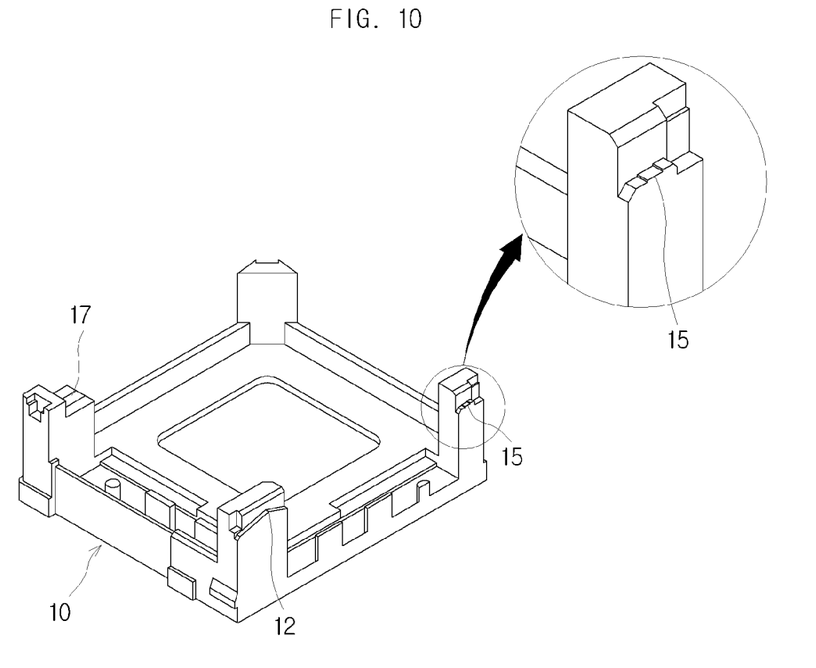

Also, as illustrated in FIG. 10, a first adjustable support 15 can be provided with steps that descend toward the base support 12, and thus the height can be adjusted depending on where the one end part 24 of the first shaft 20 is disposed.

The moving guide 30, which is coupled with the second shaft 40 and functions to guide the lens module 50 in the first axis direction, is coupled to the first shaft 20 such that the moving guide 30 can slide in the first axis direction. While the moving guide 30 is coupled to the second shaft 40, the moving guide 30 is supported by the housing 10 and also slides over the housing 10 in the first axis direction. Accordingly, as illustrated in FIG. 5, the moving guide 30 can slide in the first axis direction in a single unit with the second shaft 40.

Here, the moving guide 30 of the present embodiment can have an L-shaped form to correspond to the first shaft 20 and the second shaft 40, which are perpendicular to each other. Specifically, the moving guide 30 can include a first arm 32, which is extended in the first axis direction such that the first arm 32 slides over the first shaft 20, and a second arm 34, which is extended in a second axis direction such that the second arm 34 is coupled to the second shaft 40. Here, the perpendicular relationship between the first shaft 20 and the second shaft 40 does not necessarily mean a precise right angle but includes some tolerance.

The second shaft 40 is disposed in the second axis direction and supports the lens barrel 52 such that the lens barrel 52 can slide in the second axis direction. A coupling part 42 of the second shaft 40 is coupled to the moving guide 30, and a supported end part 44 of the second shaft 40 is supported by the housing 10 such that the supported end part 44 can slide over the housing 10.

Particularly, the second shaft 40 of the present embodiment is supported by the housing 10 such that the second shaft 40 can be tilted against the housing 10, which is a base. Accordingly, the lens barrel 52, which is supported by the second shaft 40, and the moving guide 30, which is coupled together with the second shaft 40, can be disposed at tilted angles.

Figure 6:
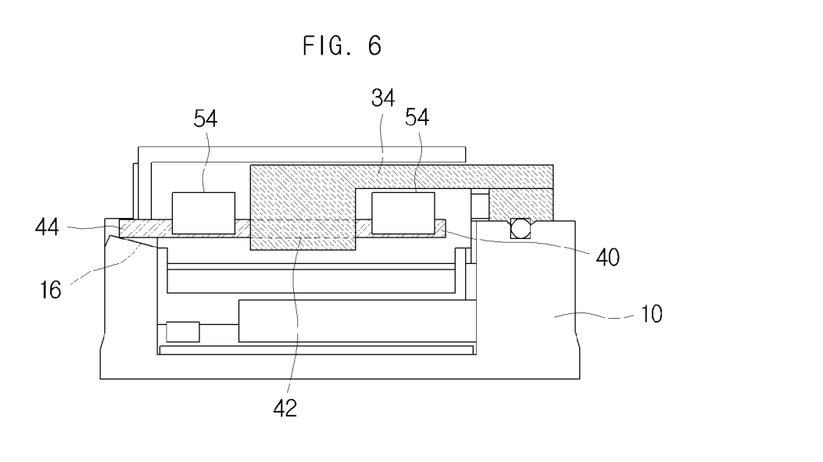

FIG. 6 shows a lens module sliding over the second shaft 40 in a camera module in accordance with an embodiment of the present invention.

As illustrated in FIGS. 5 and 6, the housing 10 of the present embodiment has the second adjustable support 16 formed therein in such a way that the supported end part 44 of the second shaft 40 is supported to be capable of height adjustment and can slide in the first axis direction. Accordingly, the second shaft 40 is coupled to the moving guide 30 such that the height of the supported end part 44 can be adjusted with respect to the coupling part 42. As a result, the second shaft 40 can be tilted against the second axis for height adjustment, i.e., tilting control of the second shaft 40 against the second axis direction is possible.

Specifically, in the present embodiment, the second adjustable support 16 is provided with a slope that declines toward the coupling part 42 so that the height of the supported end part 44 of the second shaft 40 can be readily adjusted. Accordingly, the height of the supported end part 44 of the second shaft 40 can be adjusted by changing the location where the supported end part 44 of the second shaft 40 is supported on the slope of the second adjustable support 16. Moreover, since the slope of the second adjustable support 16 is extended in the first axis direction, the second shaft 40 can slide in the first axis direction over the slope of the second adjustable support 16 when the moving guide 30 moves in the first axis direction.

Also, a second adjustable support 17 can be provided with steps that descend toward the coupling part 42, and thus the height can be adjusted depending on the location where the supported end part 44 of the second shaft 40 is disposed. Moreover, since the steps of the second adjustable support 17 are extended in the first axis direction, the second shaft 40 can slide in the first axis direction over the steps of the second adjustable support 17 when the moving guide 30 moves in the first axis direction.

Figure 7:
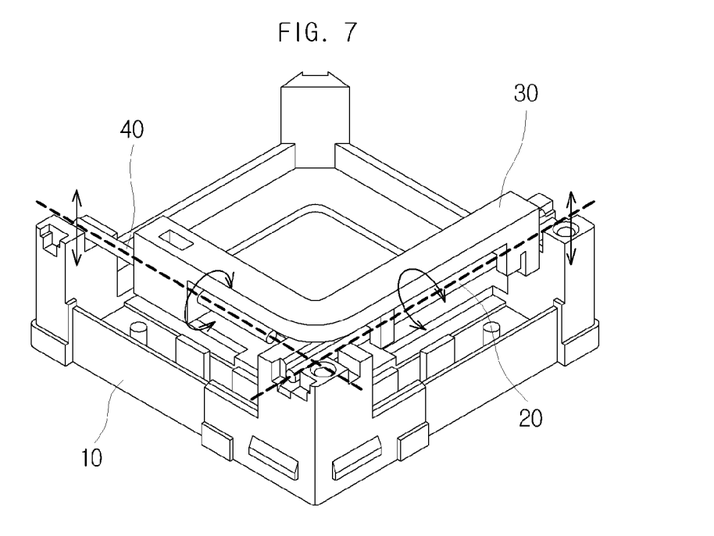

Therefore, as illustrated in FIG. 7, the first shaft 20 and the second shaft 40 of the present embodiment can be individually tilted against the first axis and the second axis, respectively. Accordingly, the first shaft 20 can be tilted against the first axis to rotate the moving guide 30 and the lens module 50 about the second axis. Also, the second shaft 40 can be tilted against the second axis to rotate the moving guide 30 and the lens module 50 about the first axis. That is, the optical axes of the lens module 50 can be compensated by tilting the optical axes against a desired direction. Accordingly, the lens module 50 mounted on the two-axis stage for compensating camera-shake can be tilted against an image sensor 80, which will be described later, and this allows a perfect alignment of the optical axis and the image sensor 80 during the assembly of the camera module.

The lens module 50 supports a lens 51 and also functions as a movable body for the two-axis stage. For this, the lens module 50 is mounted on the second shaft 40 such that the lens module 50 can slide in the second axis direction.

Specifically, the lens module 50 of the present embodiment includes the lens 51, the lens barrel 52, which houses the lens 51, and a movable housing 53, which is coupled with the lens barrel 52 and mounted on the second shaft 40 such that the movable housing 53 can slide. Here, an auto-focusing device that moves the lens barrel 52 in the optical direction can be installed in the movable housing 53.

As illustrated in FIG. 6, the movable housing 53 is equipped with a sliding guide 54 that guides the movable housing 53 when the movable housing 53 slides over the second shaft 40. The movable housing 53 of the present embodiment includes a pair of sliding guides 54 that are supported by the second shaft 40 and placed on either side of the coupling part 42 of the second shaft 40.

Also, as illustrated in FIG. 4, the movable housing 53 can be equipped with a sliding support 55 that is supported by the first shaft 20. The sliding support 55 allows the movable housing 53 to be placed on a planar surface by making the movable housing 53 slide over and supported by the second shaft 40 not only when the movable housing 53 and the moving guide 30 slide in the first axis direction but also when the movable housing 53 only slides in the second axis direction. That is, together with the pair of sliding guides 54, the sliding support 55 allows the movable housing 53 to be supported on three points.

Meanwhile, the image sensor 80, which forms an image with a ray of light incident through the lens 51, is disposed on a bottom part of the lens module 50 of the present embodiment and forms an image by using a ray of light incident through the lens module 50, the optical axis of which is aligned, as described above.

The driver 60 moves the lens module 50 in the first axis direction and/or the second axis direction in correspondence with vibrations of hands. For this, the driver 60 of the present embodiment includes a magnetic member 62, which is coupled to the movable housing 53, and an electromagnet 64, which is coupled to the housing 10 and generates a magnetic field that interacts with the magnetic field of the magnetic member 62. Accordingly, by compensating the vibrations of a user's hand, the driver 60 can move the lens module 50 such that the lens module 50 is disposed on a desired location.

The camera module of the present embodiment can also include a vibration sensor 90 that is formed in a single unit with the camera module to detect the vibrations of the user's hand. The camera module of the present embodiment can further include an image stabilizing controller 95 that calculates a moving distance required for compensating the vibration of the user's hand and controls the electromagnet 64 in correspondence with the signals of the vibration sensor 90.

Moreover, the camera module of the present embodiment can further include a Hall sensor 70 that identifies the location of the lens module 50 in order to improve the control precision of the driver 60. The Hall sensor 70 can precisely identify the location of the lens module 50 by sensing the magnetic field of the magnetic member 62 to detect a change in location of the magnetic member 62.

Although the driver 60 of the present embodiment moves the lens module 50 by using a magnetic field, it shall be apparent that the present invention is not limited to this embodiment, and the camera module of the present invention can include other various known driving means.

While the spirit of the invention has been described in detail with reference to certain embodiments, the embodiments are for illustrative purposes only and shall not limit the invention. It is to be appreciated that those skilled in the art can change or modify the embodiments without departing from the scope and spirit of the invention.

As such, many embodiments other than those set forth above can be found in the appended claims.

What is claimed is:

1. A two-axis stage comprising:
    a base;
    a first shaft including two end parts, disposed in a first axis direction and coupled to the base such that one end part of the first shaft can be tilted against the other end part of the first shaft;
    a moving guide mounted on the first shaft such that the moving guide can slide in the first axis direction;
    a second shaft disposed in a second axis direction and supported by the base such that the second shaft can be tilted against the base, wherein the second shaft comprises a coupling part and a supported end part, the coupling part being coupled to the moving guide, the supported end part being supported by the base such that the supported end part slides in the first axis direction; and
    a movable body mounted on the second shaft such that the movable body can slide in the second axis direction.

2. The two-axis stage of claim 1, wherein the base comprises:
a base support coupled to the other end part of the first shaft;
a first adjustable support coupled in such a way that the one end part of the first shaft is height adjustable; and
a second adjustable support supporting the supported end part of the second shaft in such a way that the supported end part can slide and is height adjustable.

3. The two-axis stage of claim 2, wherein the first adjustable support comprises a slope or steps, the slope declining toward the base support, the steps descending toward the base support.

4. The two-axis stage of claim 2, wherein the second adjustable support comprises a slope or steps, the slope declining toward the coupling part and extended in the first axis direction, the steps descending toward the coupling part and extended in the first axis direction.

5. The two-axis stage of claim 1, wherein the first shaft and the second shaft are disposed perpendicular to each other.

6. The two-axis stage of claim 5, wherein the moving guide comprises an L-shaped guide, the L-shaped guide comprising:
a first arm extended in the first axis direction such that the first arm slides over the first shaft; and
a second arm extended in the second axis direction such that the second arm is coupled to the second shaft.

7. A camera module comprising:
a housing;
a first shaft including two end parts, disposed in a first axis direction and coupled to the housing in such a way that one end part of the first shaft can be tilted against the other end part of the first shaft;
a moving guide mounted on the first shaft in such a way that the moving guide can slide in the first axis direction;
a second shaft disposed in a second axis direction and supported by the housing in such a way that the second shaft can be tilted against the housing, wherein the second shaft comprises a coupling part and a supported end part, the coupling part being coupled to the moving guide, the supported end part being supported by the housing in such a way that the supported end part slides in the first axis direction;
a lens module mounted on the second shaft in such a way that the lens module can slide in the second axis direction; and
a driver configured to move the lens module in the first axis direction and the second axis direction.

8. The camera module of claim 7, wherein the housing comprises:
a base support coupled to the other end part of the first shaft;
a first adjustable support coupled in such a way that the one end part of the first shaft is height adjustable; and
a second adjustable support supporting the supported end part of the second shaft in such a way that the supported end part can slide and is height adjustable.

9. The camera module of claim 8, wherein the first adjustable support comprises a slope or steps, the slope declining toward the base support, the steps descending toward the base support.

10. The camera module of claim 8, wherein the second adjustable support comprises a slope or steps, the slope declining toward the coupling part and extended in the first axis direction, the steps descending toward the coupling part and extended in the first axis direction.

11. The camera module of claim 7, wherein the first shaft and the second shaft are disposed perpendicular to each other.

12. The camera module of claim 11, wherein the moving guide comprises an L-shaped guide, the L-shaped guide comprising:
a first arm extended in the first axis direction in such a way that the first arm slides over the first shaft; and
a second arm extended in the second axis direction in such a way that the second arm is coupled to the second shaft.

13. The camera module of claim 7, wherein the lens module comprises:
a lens barrel configured to house a lens; and
a movable housing coupled to the lens barrel and mounted on the second shaft in such a way that the movable housing can slide,
wherein the driver comprises:
a magnetic member coupled to the movable housing; and
an electromagnet coupled to the housing and configured to generate a magnetic field that interacts with a magnetic field of the magnetic member.

14. The camera module of claim 13, further comprising a Hall sensor coupled to the housing and configured to detect a change in location of the magnetic member by sensing a change in magnetic field of the magnetic member.

15. The camera module of claim 13, further comprising a vibration sensor configured to detect vibrations of a hand.

16. The camera module of claim 15, further comprising an image stabilizing controller configured to control the electromagnet in correspondence with a signal of the vibration sensor.

17. The camera module of claim 7, further comprising an image sensor configured to form an image with a ray of light incident through the lens.

18. The camera module of claim 7, further comprising a vibration sensor configured to detect vibrations of a hand.

* * * * *